United States Patent [19]

Cordova et al.

[11] 4,318,137
[45] Mar. 2, 1982

[54] REAL TIME DIGITAL RECORDING SYSTEM FOR THERMOVISION DATA

[75] Inventors: Ronald J. Cordova, Nashua, N.H.; Edmund J. Peters, Bedford; James S. Martin, Brighton, both of Mass.

[73] Assignee: The United States of America as represented by the Secretary of the Air Force, Washington, D.C.

[21] Appl. No.: 900,948

[22] Filed: Apr. 28, 1978

[51] Int. Cl.³ .............................................. G11B 5/00
[52] U.S. Cl. ......................................... 360/32; 360/8; 360/9
[58] Field of Search .................. 360/32, 39, 51, 9, 8

[56] References Cited

U.S. PATENT DOCUMENTS

| | | | |
|---|---|---|---|
| 3,919,716 | 11/1975 | Yumde et al. | 360/9 |
| 4,016,361 | 4/1977 | Pandey | 358/127 |
| 4,057,836 | 11/1977 | Munsey | 358/140 |
| 4,058,835 | 11/1977 | Kennedy | 360/9 |

Primary Examiner—Vincent P. Canney
Attorney, Agent, or Firm—Donald J. Singer; Willard R. Matthews, Jr.

[57] ABSTRACT

Direct, real time digital data recording of thermal imagery is realized by the utilization of a computer that receives and stores bursts of high speed data from the digitized analog output of an infrared camera and simultaneously transfers a uniform flow of the data at a lower data rate to a digital tape recorder. The computer receives data only during camera active scan periods but transfers data to the recorder continuously. By making the computer output data rate substantially equal to the average input data rate real time recording is achieved. Full utilization of the data handling capacities of both the computer and the lower speed recorder is accomplished by digitizing the camera output signals in 8 bit words, combining pairs of 8 bit words for 16 bit word processing in the computer and reconverting the computer output data to 8 bit words for recording by the digital tape recorder.

4 Claims, 10 Drawing Figures

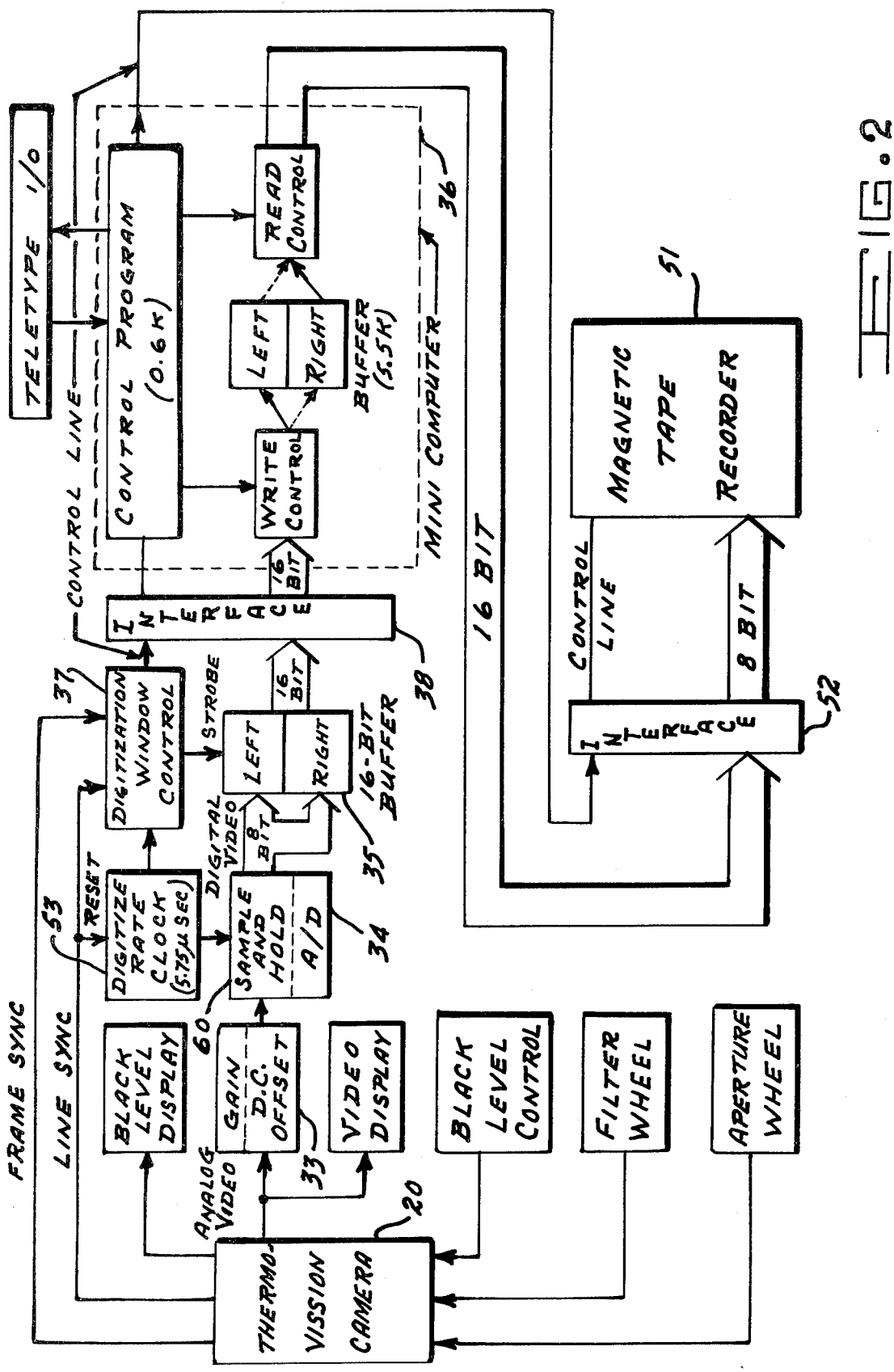

REAL TIME DIGITAL RECORDING SYSTEM FOR THERMOVISION DATA

STATEMENT OF GOVERNMENT INTEREST

The invention described herein may be manufactured and used by or for the Government for governmental purposes without the payment of any royalty thereon.

BACKGROUND OF THE INVENTION

This invention relates to video to digital data recording systems and in particular to the direct, real time digital data recording of thermal energy.

The majority of the existing and proposed digitization methods for detecting and recording thermal energy fall into three catagories: calibrated film recording; analog magnetic tape recording; and, direct digital recording. Calibrated film recording systems include an infrared camera and display, a display camera for providing calibrated photographs of the display, a microdensitometer for processing the photographs and a digital tape recorder for recording the densitometer output. Analog magnetic tape recording system include an infrared camera, conditioning electronics, an analog tape recorder, a general purpose digitization facility and a digital tape recorder. The direct digital recording system requires only the infrared camera, an analog/digital converter, a computer and the digital tape recorder.

The first two, methods require an intermediate analog storage mechanism and post-experiment digitization at non-real-time rates. The film recording method has the advantages of simplicity and economy for those laboratories with ready access to a microdensitometer. However, in many respects this is the least desirable of the three alternatives owing to the inherent non-linearity and low information density of photographic film or plates. Magnetic analog tape recording systems eliminate these problems, but still require two separate steps to produce a computer compatible digital tape. Direct digital recording systems in the past, have been less than satisfactory due to the data speed handling limitation of digital tape recording devices. State-of-the-art digital tape recorders are incapable of handling the high speed data bursts that are digitized during camera active scan periods. This limitation precludes their direct use for direct real time recording. The use of a computer as a buffer to achieve real time recording has resulted in the further limitation of having to operate some system components at less than full capacity.

The present invention is directed toward providing a direct real time digital recording system that overcomes these limitations.

SUMMARY OF THE INVENTION

The invention comprehends a direct, real time, video to digital system for recording thermal imagery. It comprises an infrared camera; an analog to digital interface consisting of an analog/digital converter, a 16 bit buffer and data clocking circuitry; a computer; a datum formatter-controller; and, a digital magnetic tape recorder. The computer operates as a temporary storage buffer between the camera and the digital tape recorder. Computer controlled timing circuits group pairs of 8 bit data words into a single 16 bit computer compatible word in the buffer for transfer into the computer's core memory. The computer stores complete frames of data during the camera's active scan period while simultaneously outputting a uniform flow of data to the digital recorder.

It is a principal object of the invention to provide a new and improved real time digital recording system.

It is another object of the invention to provide a video to digital data recording system that does not require an intermediate analog storage mechanism.

It is another object of the invention to provide a video to digital data recording system that does not require post-experiment digitization at non-real-time rates.

It is another object of the invention to provide a direct real time digital recording system that is not limited by the data rate processing capability of the digital tape recorder.

It is another object of the invention to provide a direct real time digital recording system wherein the data handling capabilities of all active components are fully utilized.

These together with other objects, features and advantages of the invention will become more readily apparent from the following detailed description taken in conjunction with the illustrative embodiment in the accompanying drawings wherein like elements are given like reference numerals throughout.

DESCRIPTION OF THE DRAWINGS

FIG. 2 is a hardware flow chart of the real time digital recording system comprehended by the inventor;

DETAILED DESCRIPTION OF THE PREFERRED EMBODIMENT

Figure 1:
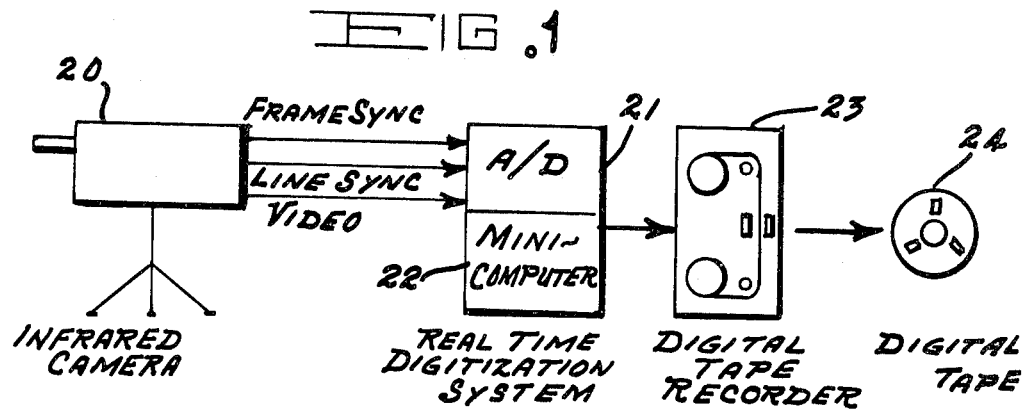
FIG. 1 is a block diagram illustrating the direct digital recording method.

The real time digital recording system of the invention comprehends a direct digitizing approach such as is illustrated in the basic digital recording system of FIG. 1. The system comprises an infrared camera 20, analog/digital converter means 21, computer means 22, and digital recording means 23. The infrared camera video is digitized in real time by fast A/D converter 21 and transferred directly to standard 9 track digital tape 24, thus eliminating the need for duplicate analog tape recorders at field sites and in the laboratory. A key advantage of this system is the capability of instant data playback and analysis which is often vital in non-repeatable experimental situations.

The system of the invention comprehends five major components. In addition to the infrared camera, analog/digital converter, computer and digital recording means shown in FIG. 1 the system also includes means for increasing and decreasing digital word bit size for computer processing. This permits the utilization of both the computer and the slower operating digital recorder to full capacity.

By way of example, the invention is hereinafter described having reference to a particular embodiment and specific components. The invention is not, of course, limited to the components and parameters given and it is intended to include all of the variations and concepts fairly inferred from the circuits and modes of operation disclosed.

In the following description the five major components of the system of the invention comprise:

An infrared AGA 680 LW camera operating in the 8–12 μm spectral waveband having an 8°×8° lens with a 1.3 mr instantaneous field of view. The noise equivalent temperature of this unit is less than 0.2° C.;

An analog to digital interface package containing a 1 μs 8 bit A/D converter, a 16 bit hardware output buffer, and data clocking circuitry which generates 2,738 sixteen bit words during each camera frame;

A Data General NOVA 2/10 minicomputer with a 32,000 word memory having a 16 bit parallel I/O central processor with a high speed direct memory access channel capable of transferring in excess of 500,000 words per second;

A Datum formatter-controller which converts the 16 bit NOVA words to standard 8 bit IBM tape format; and A Wangco 9 track digital tape recorder operating at 1600 BPI density at 75 IPS having a maximum writing speed of 120,000 eight bit words per second under continuous data transfer conditions.

The inherent spatial resolution of the AGA 680 camera yields a 100×100 picture element frame for a total of 10,000 discrete data points. However, only 74 lines are generated by each field, a complete infrared picture requires at least two or three interlaced scans out of a full 7 field frame. The simplest and most direct method of digitizing these data involves a 74×74 sampling each field, producing a 5476 discrete element frame with 1.9 mr resolution.

The collection of 74 data points during a 425 μs line scan is equivalent to an instantaneous sampling rate in excess of 175 kHz. While 8 bit word length transfer speeds up to 1 MHz can be obtained with conventional A/D converters and minicomputers, most commercial tape drive units are able to record less than 100,000 words/second under optimal conditions. The key element of the real-time digitization method of the invention is the use of a dedicated minicomputer to serve as a temporary storage buffer between the camera and the digital tape recorder. The computer is capable of storing bursts of data at the 175 kHz digitization rate while simultaneously outputting a uniform flow of data to the tape transport. Since the total time between fields is roughly twice that allotted to the active scan periods (a total of 31.05 ms is lost during the line and frame retrace periods), the average data output rate is only 88 kHz which is well within the capability of several moderately priced digital tape units now available.

Figure 3:
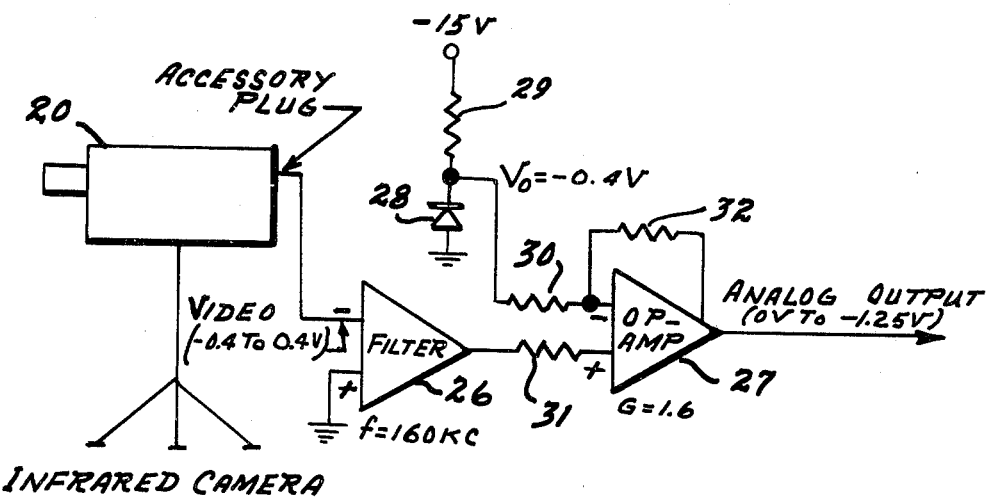
FIG. 3 is a schematic diagram of the offset and gain circuit of FIG. 2.
Figure 5:
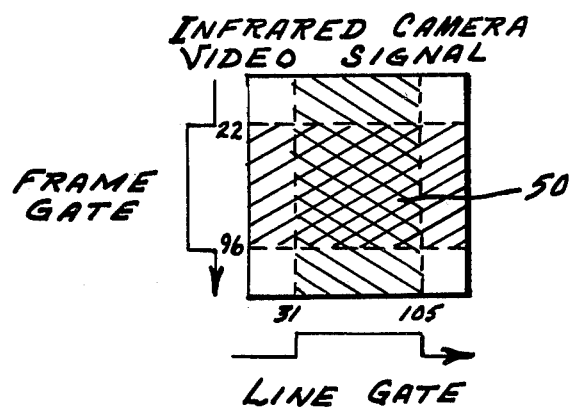
FIG. 5 is an illustration of the infrared camera video signal.

FIG. 2 is a functional block diagram of the real-time recording system of the invention. Video signals such as signal 50 of FIG. 5 taken from the camera accessory plug are conditioned prior to recording by adjustment of the picture black level to produce a normal image on the AGA analog display. The signal then passes through the D.C. offset and gain circuit 33 which places it within the input range of the 8 bit analog to digital converter 34. FIG. 3 illustrates this circuit which comprises filter 26, amplifier 27, diode 28 and resistors 29–32. The circuit gain is designed to match the digital step size to the noise equivalent temperature of the infrared system, resulting in a 50° C. dynamic range with 0.2° C. temperature resolution.

Figure 4:
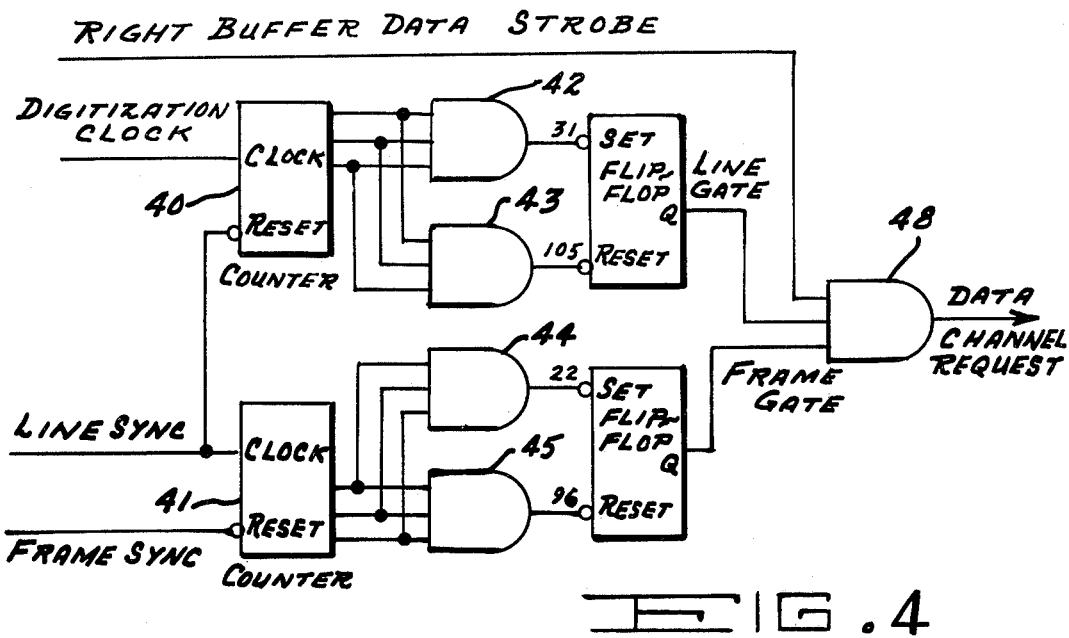
FIG. 4 is a schematic diagram of the digitization window control circuit of FIG. 2.

A 16 bit hardware buffer follows the A/D converter allowing temporary storage of two 8 bit words for subsequent transfer to the 16 bit word length memory of computer 26. The timing circuit of digitization window control 37 is described in FIG. 4. The circuit comprises counters 40, 41 AND gates 42, 43, 44, 45, 48 and flip flops 46, 47. It receives the line and frame sync pulses from the AGA 680 unit and generates time gates regulating the flow of digitized information from the hardware interface 38 to computer core memory during the camera's active scan period.

Figure 6:
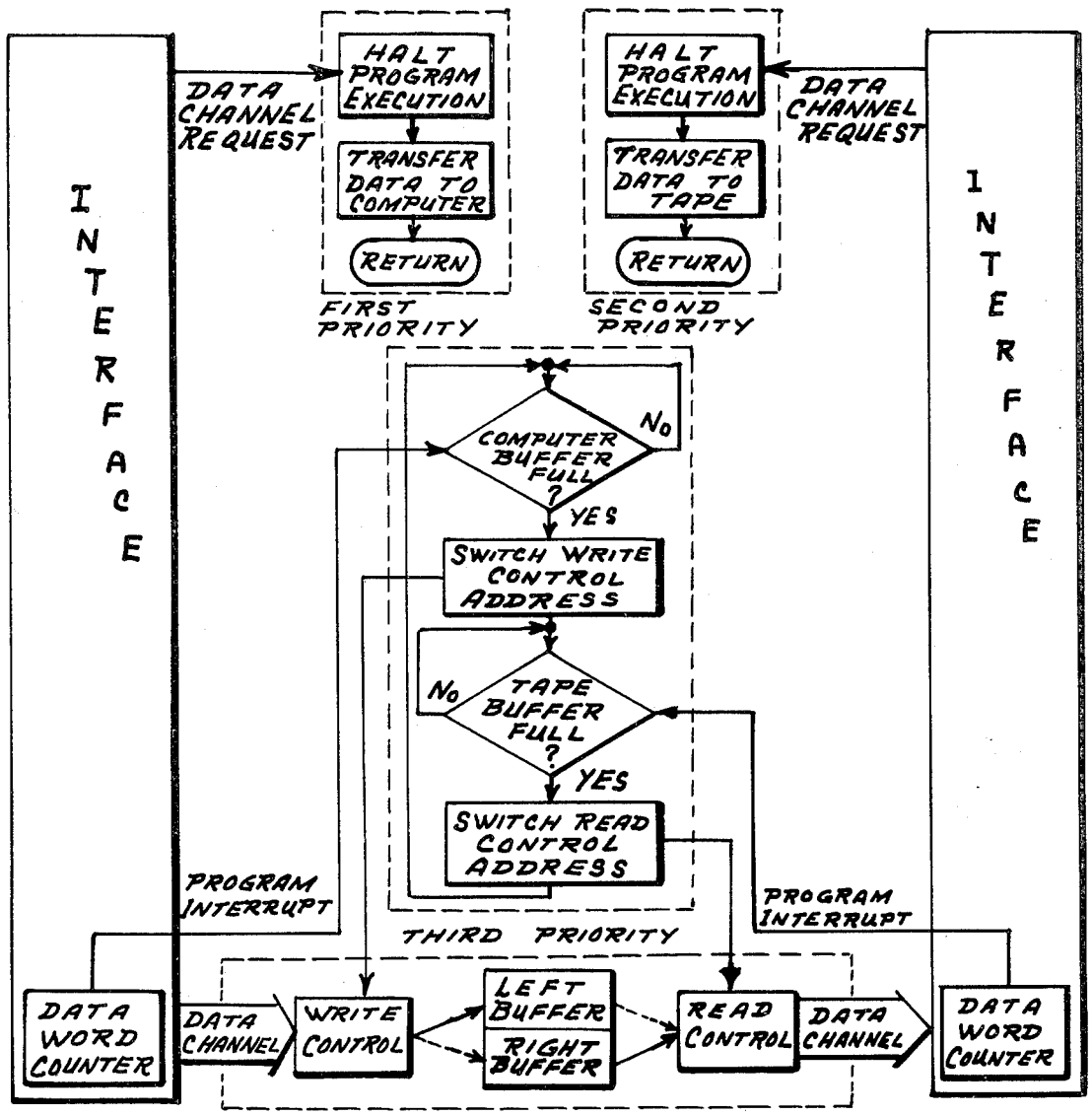
FIG. 6 is a software flow chart of the invention.

Computer input and output is handled by a high speed data channel which takes first priority in a control heirarchy which is shown in FIG. 6. A data channel request generated either by the A/D interface or the magnetic tape drive controller momentarily halts all computer operations guaranteeing uninterrupted information transfer. A low priority software program continuously performs routine functions such as resetting flags and counters; its main task is the switching of the read and write buffer addresses when program interrupts signal that these functions have been completed. A total of 600 words of software memory is allocated to these control algorithms.

Two buffers, each capable of storing a single frame of AGA data and occupying a total of 5500 words of computer memory, form the core of the real-time digital recording system of the invention. Data are written onto one memory block during the active scan period of the infrared camera while, simultaneously, the previous frame is read by the magnetic tape recorder unit 51. Thus, data transfer to tape lags the camera video signal by a full frame, proceeding at an uninterrupted average rate of 87,616 eight bit words per second. Conversion of the computer 16 bit words to tape compatible 8 bit format is performed in the computer output interface 52 by a commercially available formatter-controller.

Figure 7:
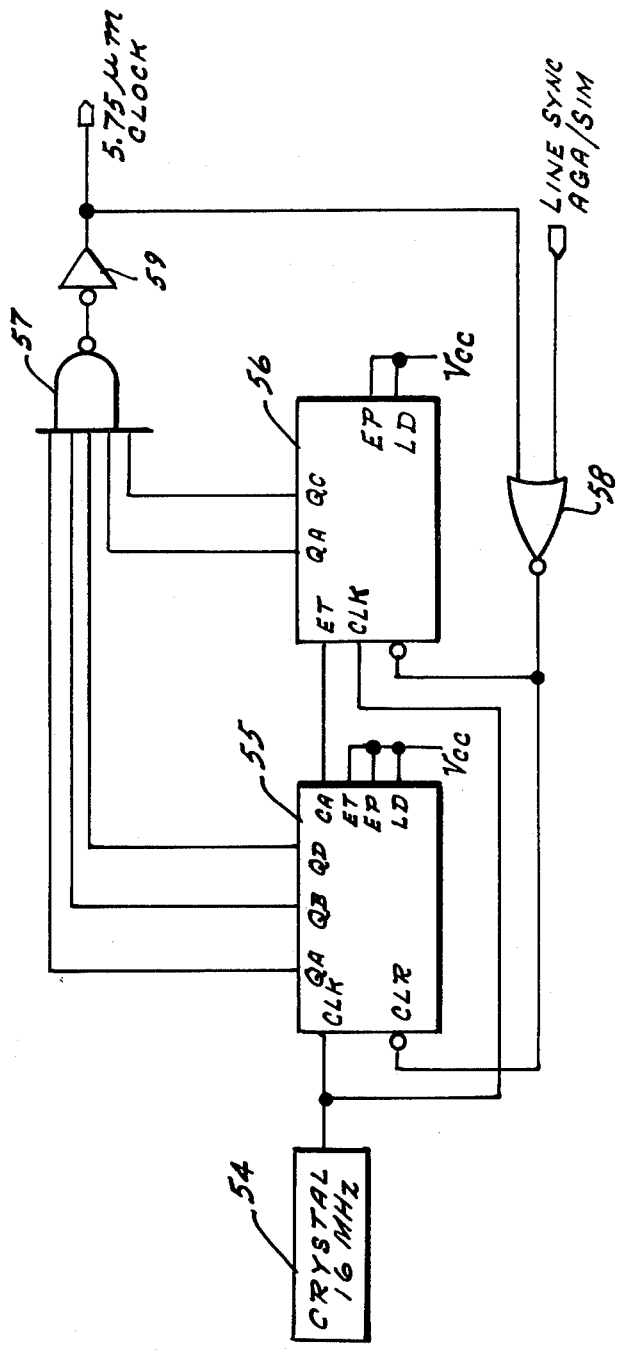
FIG. 7 is a schematic diagram of the digitize rate clock of FIG. 2.

FIG. 7 is a schematic diagram of the digitize rate clock 53. It comprises crystal 64, counters 55, 56, NAND gate 57, NOR gate 58 and inventor gate 59.

As shown in FIG. 7 the 5.75 μs clock is generated by dividing down a seven stage counter from 16 MHz crystal oscillator 54. The four bit binary counters 55, 56 are fully synchronous. The synchronous clear allows decoding using the one NAND gate 57. The selected outputs of the counters are fed through the NAND gate 57 to produce a count of 91 and this in turn is used to reset the counters 55, 56 on the next clock pulse. The counters are also reset at the beginning of each horizontal scan line which guarantees the first 5.75 μs pulse starts at the same time along each line.

Figure 8:
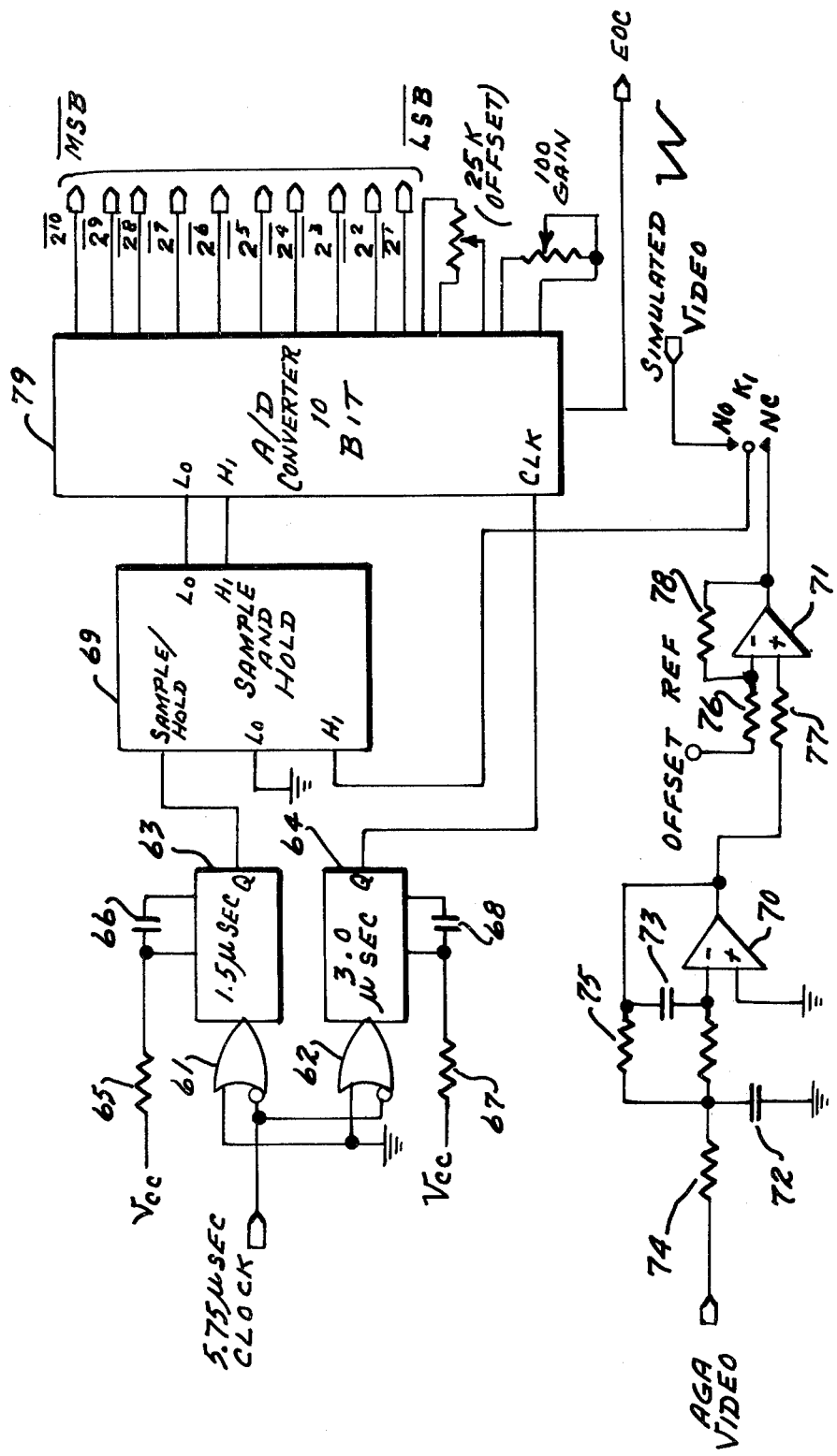
FIG. 8 is a schematic diagram of the sample and hold and analog/digital converter circuit of FIG. 2.

Sample and hold circuit 60 is illustrated by the schematic diagram of FIG. 8. It comprises NOR gates 61, 62, one shot multivibrator 63, 64 sample and hold unit 69, amplifiers 70, 71 capacitors 66, 68, 72, 73 and resistors 65, 67, 74, 75, 76, 77, 78, 80. Sample and hold unit 68 is an off-the-shelf item manufactured by DATEL Company, model SHM-2.

The 5.75μs clock is fed into dual "one shot" multivibrators 63, 64 delay of 1.5μs which is then fed to the Sample and Hold (S/H) command input to either sample or hold the video data for conversion by the analog to digital (A/D) converter 79. Since the sample and hold unit 69 has an acquisition and setting time of approximately 1 μs the A/D converter 79 will start converting after the sample and hold unit has settled. The clock for the A/D converter is generated from the second half of the one shot multivibrator. The A/D converter is in a free running mode, that is, the computer is not gating the A/D converter under software control. When the End of Conversion (EOC) goes low, the data from the A/D converter are valid and are presented to the data buffer on the computer input/output I/O board.

Figure 9:
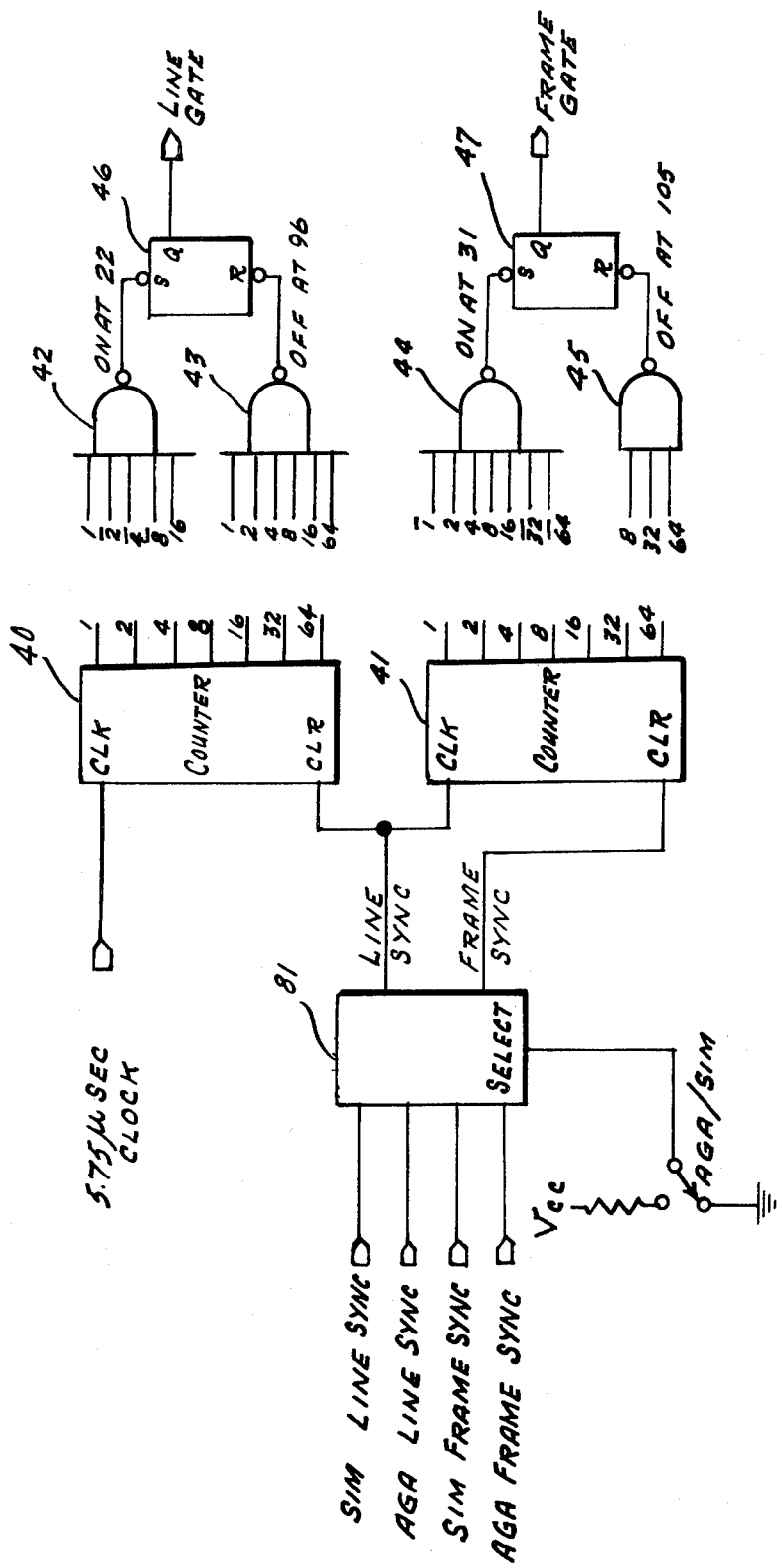
FIG. 9 is a detailed schematic diagram of the digitizing gates of the digitizing window control circuit of FIG. 2.

The digitizing window gates of digitization window control 37 (FIG. 2) are shown in detail by FIG. 9.

In FIG. 9 the 5.75μs clock is used as an input to counter 40 which generates the line gate. There are 108 individual pulses across each 625 μs horizontal scan line with the line gate window (digitizing area) being controlled by 2 binary counters 40, 41, 2 NAND gates 42, 43 or 44, 45 and 1 Flip Flop (F/F) 46 or 47. One NAND gate turns on at a count of 31 and sets the F/F to a 1 state. This remains high until the second NAND gate is activated and resets the F/F to a zero state at a count of 22 horizontal scans and off at 96. The line and frame sync signals from the camera of simulator via multiplexer 81 are used to reset their respective counters at the start of each scan.

Figure 10:
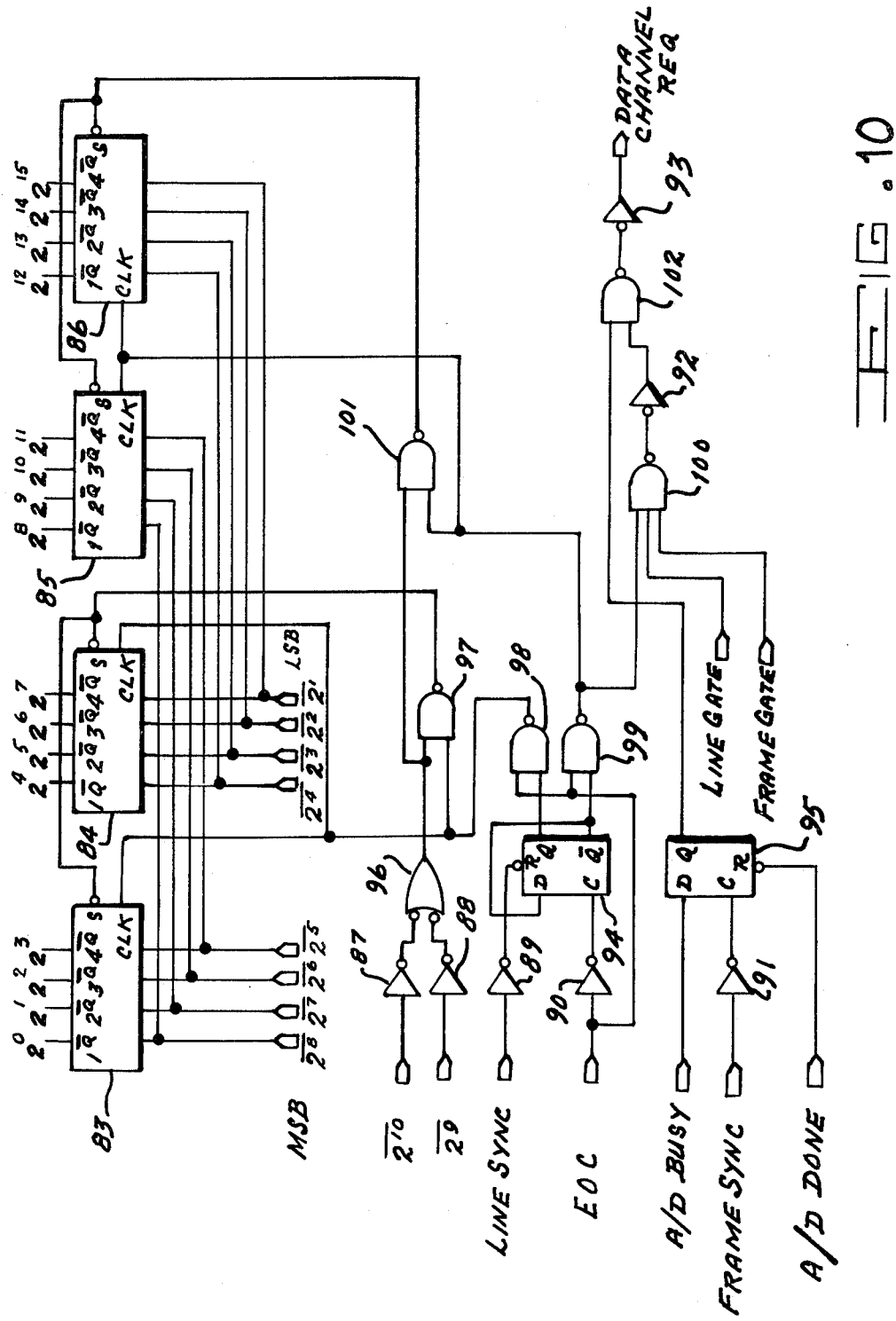
FIG. 10 is a schematic diagram of the hardware buffer and data channel control circuits of the invention.

FIG. 10 illustrates the 16 bit buffer and logic circuitry which controls data transfer to the computer. It comprises quadruple flip-flops 83, 84, 85, 86, inventor gates 87, 88, 89, 90, 91, 92, 93, flip flops 94, 95 OR inventor gate 96, and NAND gates 97, 98, 99, 100, 101, 102. The line sync resets the Q output of a flip flop (94 or 95) to a zero state at the beginning of each horizontal line. The first EOC clocks the Q output to a one state and strobes the first eight bits of data into the left half of the data buffer. On the second IOC the F/F toggles and the $\overline{Q}$ output goes high allowing data to be strobed into right half of the buffer. This left/right strobing continues until the line sync resets the F/F and continues for the next horizontal line. This portion of the circuitry is always active and is not dependent on the computer program. The data are always available on the computer bus lines. The $2^9$ and $2^{10}$ bits are used to detect overflow of the data since they go high only when saturation occurs. The A/D busy is set to the one state by the A/D start computer subroutine. On the next frame sync the flip flop Q output will go to a one state which guarantees that the data will be at the start of a frame and in sync with the program when the computer program is initiated. The data in the buffers are transferred to computer memory when the following conditions are met:

1. A/D busy is 1,
2. data are within the window area (controlled by the line and frame gates), and
3. data have been strobed into the right half of the data buffer. The data are transferred to core memory using the direct memory access channel.

A word counter and memory address counter are needed to transfer data by Direct Memory Access (DMA). At the initiation of transmission, the word counter is loaded with the negative of the data block word count. Each time a word is transferred the counter is incremented by 1. When the counter overflows, the data channel transfers are terminated.

The memory address counter contains the address in memory which is to be used for the next transfer. It is loaded by the computer program with the address of the first word in the block to be transferred. After each transmission, the memory address counter is incremented.

When the A/D has a word of data ready to be transferred to memory it issues a data channel request to the processor. The processor pauses as soon as it has finished the last instruction and begins the data cycle by acknowledging the A/D's data channel request. The acknowledgement signal causes the A/D to send back to the processor the address of the memory location involved in the transfer. The memory address counter and word counter are then incremented by 1. When the word count becomes 0 the A/D Busy Flag is rest to O requesting an interrupt and the A/D Done Flag is set to a 1 terminating Data Channel transmission.

Although the inherent resolution of the AGA camera equipped with an 8° lens in the present example is approximately 1.3 mr, and the 74×74 digitization format results in 1.9 mr picture element cell size, the full camera resolution can be recovered at the expense of a lower output field rate. Since the use of the minicomputer as an intermediate storage buffer removes the tape unit writing speed limitation, much larger data fields can be recorded as long as the average transfer rate is held below 100,000 words per second. Because of this, the system of the invention can be easily modified to sample more frequently across each scan line and to make use of the camera interlace pattern to record 140×140 picture element frames at a rate of 4 fields per second.

While the invention has been described in terms of one presently preferred embodiment it is understood that the words which have been used are words of description rather than words of limitation and that changes within the purview of the appended claims may be made without departing from the scope and spirit of the invention in its broader aspects.

What is claimed is:

1. A direct video to digital data recording system comprising
    infrared camera means having a given frame rate and generating analog output signals during active scan periods,
    analog/digital converter means for digitizing the analog output signals at a high data rate,
    digital data recording means, and
    computer means, said computer means being adapted to receive and store digitized data from said analog/digital converter means at said high data rate during camera active scan periods while simultaneously transferring a continuous uniform flow of said digital data previously and currently received in sequence of arrival to said digital data recording means at a lower data rate.

2. A direct video to digital data recording system as defined in claim 1 wherein said lower data rate is substantially equal to the average rate of data received by said computer means.

3. A direct video to digital data recording system as defined in claim 2 wherein said analog signals are digitized to form n-bit words, n being an integer, and
    said data recording system includes
    buffer means receiving data from said analog/digital converter means for storing m n-bit words to form mn-bit words, m being an integer, a first interface means for transferring said mn-bit words to said computer means, said computer means processing said digitized data in mn bit words, and a second interface means converting computer mn-bit output words to n-bit words for recording by said digital recording means.

4. A direct video to digital data recording system as defined in claim 3 wherein said digital data recording means comprises a digital magnetic tape recorder.

* * * * *